G. H. McCAUSLAND.
BAKER'S OVEN.
APPLICATION FILED APR. 28, 1913.
1,101,305.
Patented June 23, 1914.
2 SHEETS—SHEET 1.
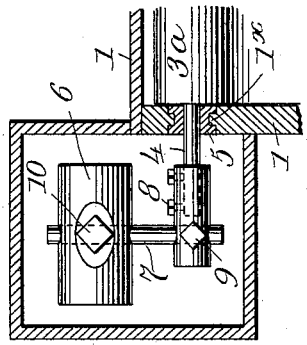
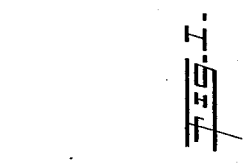
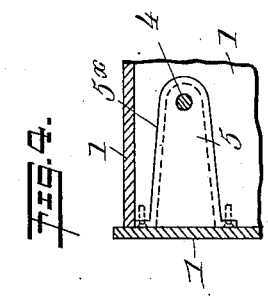
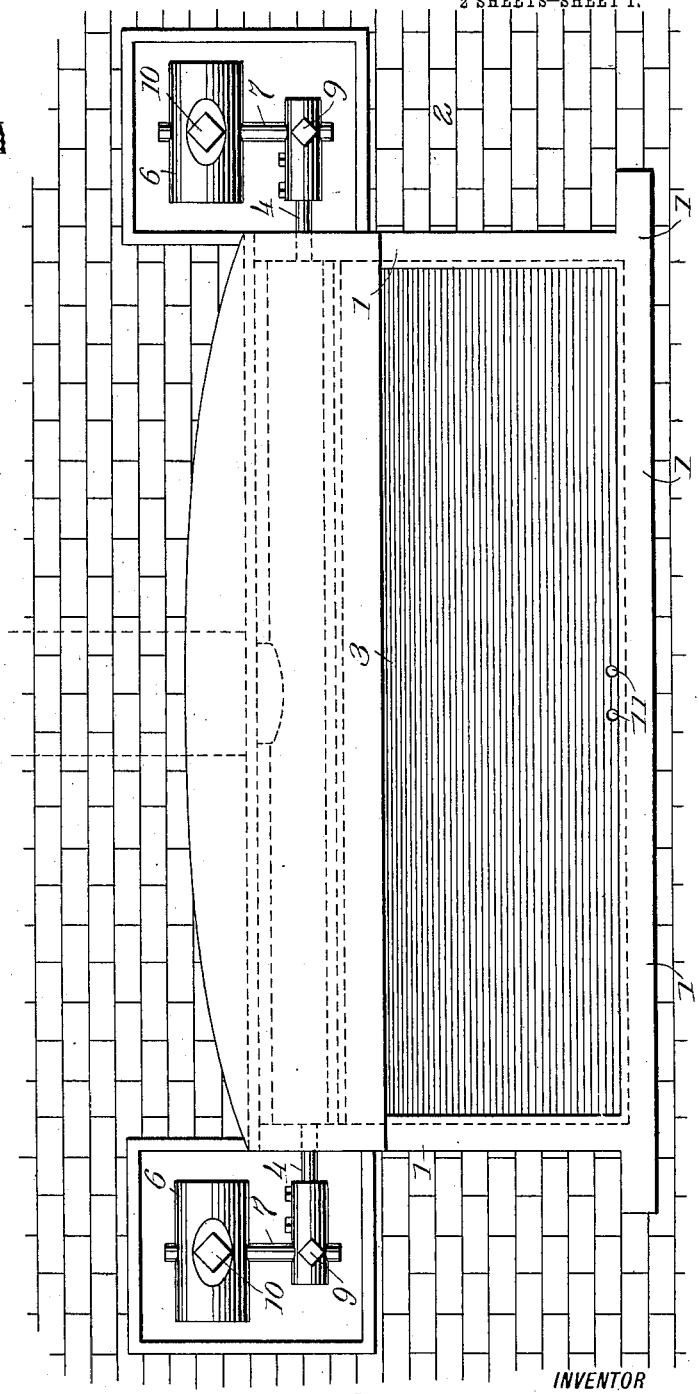
WITNESSES
G. Robert Thomas
L A Stanley
INVENTOR
George Henderson McCausland
BY Munn & Co
ATTORNEYS G. H. McCAUSLAND.
BAKER'S OVEN.
APPLICATION FILED APR. 28, 1913.

1,101,305.

Patented June 23, 1914.

2 SHEETS—SHEET 2.

WITNESSES
G. Robert Thomas
L. A. Stanley

INVENTOR
George Henderson McCausland
BY Munn & Co
ATTORNEYS

COLUMBIA PLANOGRAPH CO., WASHINGTON, D. C.

UNITED STATES PATENT OFFICE.

GEORGE HENDERSON McCAUSLAND, OF PHILADELPHIA, PENNSYLVANIA.

BAKER'S OVEN.

1,101,305.  Specification of Letters Patent.  Patented June 23, 1914.

Application filed April 28, 1913. Serial No. 764,018.

*To all whom it may concern:*

Be it known that I, GEORGE HENDERSON MCCAUSLAND, a citizen of the United States, and a resident of Philadelphia, in the county of Philadelphia and State of Pennsylvania, have made certain new and useful Improvements in Bakers' Ovens, of which the following is a specification.

My invention relates to improvements in bakers' ovens, and it consists in the combinations, constructions, and arrangements herein described and claimed.

An object of my invention is to provide means for carrying away any steam which has escaped from the oven between the edge of the oven door and the wall or door frame.

A further object of my invention is to provide a novel form of oven door having channels along its edges with means for circulating air through the channels to carry away the steam into a flue leading to the chimney.

Other objects and advantages will appear in the following specification and the novel features of the device will be particularly pointed out in the appended claims.

My invention is illustrated in the accompanying drawings forming part of this application in which—

Figure 2:
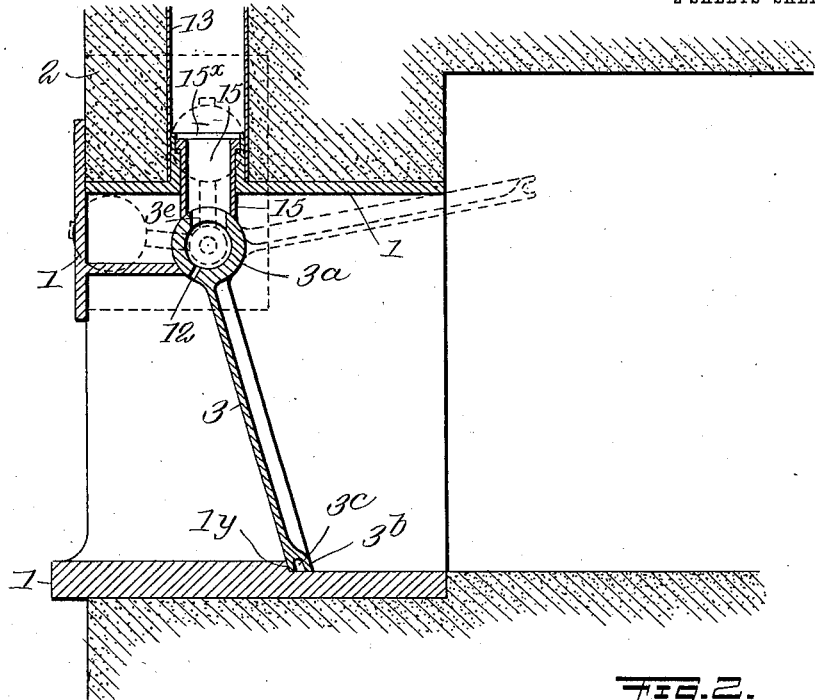
Figure 3:
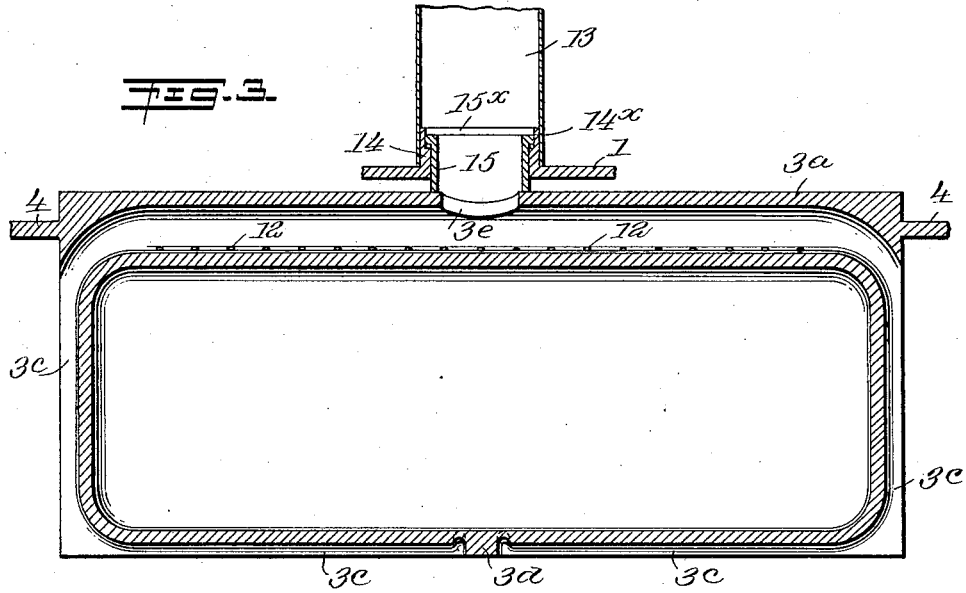

Figure 1 is a face view of an oven constructed according to my invention, Fig. 2 is a section through a portion of the oven and door, Fig. 3 is a section through the door on a plane at right angles to Fig. 2, Fig. 4 is a fragmentary section showing a bearing for the door trunnions, and Fig. 5 is a section through the bearings at right angles to Fig. 4.

In the baking of bread in large bakeries steam is injected into the oven. The temperature required in the oven ranges from 430° to 500° F. at which temperature the steam becomes superheated. When the oven is filled with bread and the door closed, some of this steam escapes through the interstices between the door and the frame into the bake house where it sometimes condenses upon the walls and ceilings and, in combination with the flour in the air, forms an unsightly paste. It sometimes drips on bread not yet baked thereby resulting in a loss to the baker.

In carrying out my invention I provide a door frame 1 which is secured in the door opening of the oven 2. The door 3 is provided with trunnions 4, at its ends, which are arranged to be supported in bearings 5 like those shown in Figs. 4 and 5. The latter are preferably of the shape shown in Fig. 4 and are provided with grooves $5^x$ arranged to receive tongues $1^x$ in the walls of the door frame 1 so as to be flush with the walls, as shown in Fig. 5. Each trunnion bears a counterweight 6 on a rod 7. Set screws 8, 9, and 10 are provided for adjusting the weight 6 so as to properly balance the door.

The door itself comprises a body portion 3, having an integral tube $3^a$ at its top. Along the sides and bottom of the door is a bead or thickened portion $3^b$ which is provided with a groove or channel $3^c$ that communicates with the tube $3^a$ as shown in Fig. 3. At the central portion of the door and at the bottom thereof is a partition $3^d$ which divides the groove $3^c$ into two parts. In Fig. 1 I have shown two openings 11. One of these openings communicates with the portion of the groove $3^c$ on one side of the partition $3^d$, and the other opening communicates with the groove on the opposite side of the partition $3^d$. The tube $3^a$ is provided with a series of openings or perforations 12, leading to the space in front of the door.

At 13 I have shown a discharge flue, preferably made of copper or other suitable material, which leads to the stack (not shown). A collar 14 is cast integrally with the door frame 1 and is provided with an enlarged bore $14^x$ arranged to receive the flange $15^x$ of the collar 15, which is ground to fit the tube $3^a$. The latter is provided with an opening $3^e$ which is in registration with the collar 15 when the door is in its closed position as shown in Fig. 2.

From the foregoing description of the various parts of the device the operation thereof may be readily understood.

Fig. 2 shows the door in its closed position in which position it abuts a shoulder $1^y$ on the bottom member of the door frame 1. Any steam which might tend to escape past the bottom or ends of the door will necessarily have to pass the channels $3^c$. Air, however, entering through the openings 11 tends to carry the steam through both branches of the groove $3^c$ into the tube $3^a$ and thence out through the opening $3^e$ and into the pipe 13 and thence to the stack.

The purpose of the small openings 12 is to draw off any steam which has escaped around the upper part of the door. Since a draft is continually passing around the bottom and ends of the door, there is very little chance for the steam to escape into the bake room. The channels 3ᶜ are curved at the corners of the door so as to offer least resistance to the current.

The main purpose of the partition 3ᵈ is to insure a continual draft along the bottom and up around the ends of the door, since without the partition the draft might be around one end, and this might tend to entrain the air in the passage extending to the opposite end, thus interfering with the draft around the opposite end or even causing it to flow in a direction contrary to that which it is desired to have it flow. Thus if one end of the door should be more highly heated than the other, the draft in one direction will be stronger than in the other. With the partition 3ᵈ, however, the draft around one end of the door cannot in any way interfere with the draft around the other end and there is always a positive flow of air from the partition along the bottom of the door and upwardly around the ends. When the door is opened the counter weight 6 will hold it in the dotted line position shown in Fig. 2. In this position communication with the exit pipe 13 will be cut off, but when the door is shut again it will be reëstablished.

I claim:

1. The combination with a baker's oven having a door frame, of a door carried by the frame, said door having channels along certain of its edges, a tube carried by the door along one edge thereof and communicating with said channels, a discharge pipe, and means for establishing communication between said tube and said discharge pipe.

2. The combination with a baker's oven having a door frame, of a door pivotally carried by the frame, said door having a tube at one edge and channels in the ends and the bottom of the door, a partition carried by the door for separating portions of said channel, said door being provided with openings for establishing communication between the exterior of the oven and the channels on each side of said partition.

3. The combination with a baker's oven having a door frame, of a door, trunnions therefor journaled in the door frame, a hollow tube carried by said door along the upper edge thereof, said door being provided with channels communicating with said tube at its ends and extending along the edges of the door and along the bottom of the door, a partition carried by the door at its bottom for separating portions of the channel, said door being provided with openings for establishing communication between the exterior of the oven and the channels on each side of said partition, a flue, and means for establishing communication between said tube and said flue when the door is closed.

4. The combination with a baker's oven having a door frame, of a door, trunnions therefor journaled in the door frame, a hollow tube carried by said door along the upper edge thereof, said door being provided with channels communicating with said tube at its ends and extending along the edges of the door and along the bottom of the door, a partition carried by the door at its bottom for separating portions of the channel, said door being provided with openings for establishing communication between the exterior of the oven and the channels on each side of said partition, a flue, and means for establishing communication between said tube and said flue when the door is closed and for cutting off communication when the door is opened.

5. The combination with a baker's oven having a door frame, of a door for said oven, trunnions carried by said door near the upper edge thereof, a tube carried by said door along the upper edge of the latter, the axis of the trunnions and the tube being coincident, a stack, an extension carried by said stack and arranged to engage the tube, said tube being provided with an opening arranged to register with said extension when the door is closed, said tube being provided with openings for establishing communication between the tube and the space in front of the door.

6. The combination with a baker's oven having a door frame, of a door for said oven, trunnions carried by said door near the upper edge thereof, a tube carried by said door along the upper edge of the latter, the axis of the trunnions and the tube being coincident, a stack, an extension carried by said stack and arranged to engage the tube, said tube being provided with an opening arranged to register with said extension when the door is closed, and said door being provided with channels along its ends and bottom and having openings on its outer side for establishing communication between the exterior of the oven and said bottom channels.

GEORGE HENDERSON McCAUSLAND.

Witnesses:
ARTHUR COVE,
LEWIS JESSUM.